Patented Aug. 1, 1950

2,516,892

UNITED STATES PATENT OFFICE 2,516,892

REFRACTORY CONCRETE

Frank E. Lobaugh, South Plainfield, N. J., assignor to Universal Atlas Cement Company, a corporation of Indiana No Drawing. Application September 17, 1946, Serial No. 697,574

2 Claims. (Cl. 106—64)

This invention relates to an improved refractory, more particularly a refractory concrete of which an essential component is calcium aluminate cement.

Among the objects of the invention is the provision of an improved refractory composition yielding articles such as refractory shapes of improved strength at elevated temperatures, and of refractory shapes resulting from such composition.

A further object of the invention is the provision of an improved refractory composition for use in the forming of veneer or wash coatings of improved strength and refractory properties, and of refractory shapes provided with such coatings.

Refractory materials or concretes composed of calcium aluminate cement and various refractory aggregates have been employed successfully in applications where they are subjected to high temperatures. Such applications include roofs, side walls, and hearths of various types of furnaces, coke oven door linings, and annealing furnace and tunnel kiln car tops. Calcium aluminate cement when mixed with water form certain hydrated compounds which, when heated to elevated temperatures, lose appreciable portions of the combined water which results in reduced hydraulic strength. This loss of combined water increases with increase in temperature until at some temperature above 1600° F. all combined water is driven off and no hydraulic strength is present. When calcium aluminate cement is used as a binder for refractory aggregates the resulting concrete likewise loses its hydraulic strength upon heating to some temperature above 1600° F. At temperatures in the vicinity of 1600° F., however, the concrete develops an appreciable ceramic strength by reason of the melting of some of the low melting compounds in the cement which combine with the aggregate to form a ceramic bond. Such ceramic strength increases with the increase in temperature until the softening point of the concrete mixture is reached.

The improved refractory composition of the present invention includes as an admixture an element or elements which are at least substantially insoluble in water and in cement mixes, and thus do not affect the hydraulic strength of the concrete, but which have a relatively low melting point, that is, 1600° F. or below, so that at such temperatures they provide the refractory concrete with a ceramic bond of increased strength. Such admixture must have a solubility in water and in cement mixes not exceeding 0.1% by weight thus not appreciably altering the time of hydraulic set of the concrete or its strength, but must melt at a low enough temperature to add materially to the strength of the ceramic bond at temperatures which substantially overlap the upper end of the temperature range at which hydraulic strength is present in the concrete. Specifically, the invention employs for such purpose a frit which is a smelted raw mixture of soluble and insoluble inorganic materials. Such smelting is carried out by melting the soluble materials in the presence of sufficient silica and at a high enough temperature to form substantially insoluble silicates. The frits employed in the present invention must have sufficient silica present so that upon being melted they form substantially insoluble silicates, since otherwise they might affect the hydraulic set of the cement and thus defeat the purpose of the admixture. Frits, both glaze and porcelain enamel, which have a melting point of 1600° F. or less, and which have solubilities in water and in cement mixtures not exceeding 0.1% by weight of the frit, may be employed in the practice of the invention.

The present invention consists in the addition of such frit to calcium aluminate cement in the formation of refractory material. Refractory material within the scope of the present invention consists of calcium aluminate cement, the above defined frit, and refractory materials which may be in the form of aggregates. The refractory concrete of the present invention is made from a mix, the constituents of which lie within the following limits, given as per cent of the total weight of the mix:

|  | Per cent |
| --- | --- |
| Calcium aluminate cement | 5 to 60 |
| Refractory aggregate | 15 to 93.5 |
| Substantially insoluble frit melting at 1600° F. or less | 0.5 to 25 |

In certain instances it is preferred to use a somewhat higher low limit of the frit content. In such cases the constituents of the mix lie within the following limits, given as per cent of the total weight of the mix or batch:

|  | Per cent |
| --- | --- |
| Calcium aluminate cement | 5 to 60 |
| Refractory aggregate | 15 to 92.5 |
| Substantially insoluble frit melting at 1600° F. or less | 2.5 to 25 |

The calcium aluminate cement employed is one which is generally known in the United States as "Luminite" cement. Such cement is also referred to as high alumina, alumina, or fused cement.

As above stated the frit to be employed is either a glaze or porcelain enamel frit substantially insoluble in water and cement mixtures, and which has a melting point of 1600° F. or less. The following are three examples of typical frits which may be used, the compositions thereof being given in per cent by weight:

FRIT NO. 1

| | Per cent |
|---|---|
| $SiO_2$ | 22–56 |
| $Al_2O_3$ | 3– 8 |
| $B_2O_3$ | 8–33 |
| $K_2O$ | 3– 7 |
| $Na_2O$ | 3–14 |

Minor amounts, totaling approximately 20% at most of $CaF_2$, $Na_2CO_3$, $NaNO_3$, $CaO$, $Fe_2O_3$, $MgO$, and so forth.

The above frit is suitable for use as a porcelain enamel ground coat.

FRIT NO. 2

| | Per cent |
|---|---|
| $SiO_2$ | 9–73 |
| $Al_2O_3$ | 2–10 |
| $B_2O_3$ | 5–28 |
| $K_2O$ | 2– 9 |
| $Na_2O$ | 2–16 |

Minor amounts, totaling approximately 25% at most of $Na_2CO_3$, $Na_3AlF_6$, $NaNO_3$, $CaO$, $Fe_2O_3$, $MgO$, and so forth.

Frit No. 2 is suitable for use as a porcelain enamel cover coat.

FRIT NO. 3

| | Per cent |
|---|---|
| $SiO_2$ | 31–62 |
| $B_2O_3$ | 12–25 |
| $Fe_2O_3$ | 1– 8 |
| $CaO$ | 5–20 |
| $Na_2O$ | 5–24 |

Minor amounts, totaling approximately 10% at most, of $CaO$, $Fe_2O_3$, $MgO$, and so forth.

Frit No. 3 was formed by smelting together a mixture of Rasorite, a borax compound, Calox, $Na_2O$, $CaCO_3$, and $SiO_2$ to yield a composition within the above range. Rasorite contains approximately 27.50% $Na_2O$, 61.50% $B_2O_3$, and 5.50% $SiO_2$ with lesser amounts of $Al_2O_3$, $Fe_2O_3$, $CaO$, and $MgO$. Calox consists of calcined limonite ($2Fe_2O_3 \cdot 3H_2O$).

The constituents of the mix are supplied thereto in either united or granular form to allow them to be uniformly distributed throughout the mix and consequently the resulting concrete. Those consituents which form the bond are preferably finely ground to faciliate their reaction. The calcium aluminate cement, for example, may be of such fineness that practically all particles will pass through a 100 mesh screen, and the frit may be of approximately the same particle size. The refractory aggregate or filler, which may be fire clay grog, crushed firebrick, expanded shale, diatomaceous earth, vermiculite, crushed red brick, and the like, or combination of such aggregates, may be of any desired particle size or range of particle sizes consistent with substantial uniformity of distribution throughout the resulting concrete.

The mix may conveniently be made by mixing the calcium aluminate cement and the frit in dry condition to a uniform color, the refractory aggregate being thoroughly wet down with water and then added to the calcium aluminate cement and frit mixture. Sufficient water is added to the resulting mixture to render it workable, the amount added depending upon the manner in which the mixture is to be subsequently handled in the formation of the concrete shape or structure. Thus, if the concrete is to be cast into a mold or form, particularly if the shape is intricate, the mix should be of puddling consistency. For simple shapes, so cast, less water may be used, whereas if the mix is to be tamped or vibrated into place or molded under pressure, still less water may be used. It is obvious that sufficient water may be used in all cases to develop fully the hydraulic strength of the cement and that an excess of water should be avoided.

The above directions apply mainly to the formation of cast shapes or structures from the mix of the invention. When such mix is to be employed for the making of veneer coatings or wash coats to other more refractory shapes such as bricks, tiles, and the like, or as coatings or patches on larger shapes or structures such as furnace walls and kiln car tops, it is obvious that the procedure must be modified accordingly. Thus for the veneer coatings, which ordinarily will be of the thickness on the order of one inch, the aggregate will be required to be of a particle size smaller than that for most cast shapes. For the wash coatings all ingredients of the mix should be finely ground. Further, when used as a wash coating larger amounts of water are required than in the other applications above outlined.

After the castable mixtures above described have been shaped or molded, and in the case of the veneer or wash coating after the refractory shape or structure has been so coated, such shapes, consisting solely of or in part of the wet refractory mixture of the invention, are dried and then heated. Usually for shapes of large section, such as cast furnace walls, the practice follows approximately that employed in the drying and heating of newly constructed firebrick linings. The concrete may be dried for a period of several days, after which the furnace is heated at temperatures which gradually increase up to operating temperature. Smaller blocks and shapes composed solely of such refractory mixture, such as cast bricks, tiles, and slabs, and refractory shapes with veneer or wash coatings of such mixture, may be kept for a time on the order of twenty-four hours in a high humidity-constant temperature atmosphere, dried at a low temperature on the order of 230° F., and then subjected to a high temperature approximating that at which the shape may be used, for example, 1600° F.

Concrete resulting from mixes made in accordance with the present invention, after having been dried and heated as above, possesses increased strength at both atmospheric and elevated temperatures as compared to similar concretes made from mixes containing no frit. Such increased strength of the concrete of the present invention at room temperatures are shown by the results set out by the following tables, which give the compressive strengths of two-inch cubes of mixtures containing the indicated percentages by weight of calcium aluminate cement, frit, and refractory aggregate. In the making of such two-inch test cubes the mix was made of a puddling consistency and cast into two-inch cube molds. After treatment in a moist cabinet, the cubes were dried at 230° F., fired for four days at the indicated temperature, and were then allowed to cool. After cooling, each cube was subjected to a compressive strength test at room temperature by subjecting it to gradually increasing pressure until a point of failure of the cube was reached.

In Tables I and II below the mixes employed contained calcium aluminate cement, porcelain enamel frit, and, as the aggregate, Haydite, an expanded shale aggregate, and crushed firebrick, respectively. Such refractory aggregates had the following screen analyses:

SCREEN ANALYSES

|  | Per Cent on Mesh No. | | | | | | |
|---|---|---|---|---|---|---|---|
|  | 4 | 8 | 14 | 28 | 48 | 100 | Thru 100 |
| Haydite | 15.2 | 10.8 | 21.2 | 18.2 | 12.0 | 7.8 | 14.8 |
| Crushed firebrick | 12.3 | 16.0 | 19.2 | 14.0 | 11.7 | 10.8 | 16.0 |

The porcelain enamel frit was one designated No. 1100. Its analysis falls generally under that of frit No. 2 above as seen by its composition, as follows:

NO. 1100 PORCELAIN ENAMEL FRIT

| | Per cent |
|---|---|
| $SiO_2$ | 51.0 |
| $Al_2O_3$ | 7.2 |
| $B_2O_3$ | 12.4 |
| CaO | 4.3 |
| $Na_2O$ | 15.6 |
| $K_2O$ | 3.4 |
| F | 6.1 |

The frits were ground to such fineness that not more than 2.6% remained on a 200 mesh sieve. The calcium aluminate cement was of such fineness that 14.7% remained on a 325 mesh sieve. Each of the values given for each test in the following Tables I to IV, inclusive, represents the average of test on three similar two-inch cubes.

TABLE I

Calcium aluminate cement—Haydite plus porcelain enamel frit

| Per Cent Frit By Weight of Cement | Per Cent Frit in Total Batch, by wt. | Per Cent Cement in Total Batch, by wt. | Per Cent Haydite in Total Batch, by wt. | Compressive Strength, lbs. per Sq. Inch 4 Days Firing at— | |
|---|---|---|---|---|---|
| | | | | 1400° F. | 1600° F. |
| 0 | 0 | 30.9 | 69.1 | 548 | 371 |
| 12½ | 3.7 | 29.3 | 66.5 | 818 | 524 |
| 25 | 7.2 | 28.8 | 64.0 | 765 | 517 |
| 50 | 13.4 | 26.7 | 59.9 | 912 | 858 |
| 75 | 18.9 | 25.1 | 56.0 | 928 | 1,327 |
| 100 | 23.6 | 23.6 | 52.8 | 1,320 | 3,092 |

TABLE II

Calcium aluminate cement—crushed firebrick plus porcelain enamel frit

| Per Cent Frit By Weight of Cement | Per Cent Frit in Total Batch, by wt. | Per Cent Cement in Total Batch, by wt. | Per Cent Crushed Firebrick in Total Batch, by wt. | Compressive Strength, lbs. per Sq. Inch 4 Days Firing at— | |
|---|---|---|---|---|---|
| | | | | 1400° F. | 1600° F. |
| 0 | 0 | 20.7 | 79.3 | 1,193 | 854 |
| 12½ | 2.5 | 20.0 | 77.5 | 1,160 | 725 |
| 25 | 4.8 | 19.5 | 75.7 | 1,029 | 869 |
| 50 | 9.3 | 18.7 | 72.1 | 1,108 | 1,372 |
| 75 | 13.3 | 17.8 | 68.9 | 1,202 | 2,963 |
| 100 | 17.0 | 17.0 | 66.0 | 1,219 | 3,944 |

As seen from Table I the addition of as small an amount as 3.7% by weight of porcelain enamel frit in the total batch results in marked improvement in the compressive strength of the concrete, both when fired for four days at 1400° F. and at 1600° F., such improvement in strength increasing as the amount of frit in the batch is increased. With a concrete containing crushed firebrick aggregate, Table II, the increase in compressive strength in concrete fired for four days at 1600° F. is not obtained until at least 4.8% by weight of frit in the total batch is employed, marked increase in strength being obtained upon the use of still higher percentages of frit. The strength of the concrete shown in Table II when fired at 1400° F. at four days remains substantially constant with increased frit content.

Increased strength is also obtained when glaze frits are employed as an admixture in the disclosed cement-aggregate mixes. In the tests on two-inch cubes set out in Tables III and IV below the mixes employed are the same as those in Tables I and II, respectively, except that in Tables III and IV the frit employed is a glaze frit having the following composition:

GLAZE FRIT

| | Per cent |
|---|---|
| $Na_2O$ | 10.6 |
| CaO | 17.7 |
| $Fe_2O_3$ | 1.1 |
| $B_2O_3$ | 23.9 |
| $SiO_2$ | 46.7 |

It will be seen that such glaze frit falls within the composition range of frit No. 3 above.

TABLE III

*Calcium aluminate cement—Haydite plus glaze frit*

| Per Cent Frit By Weight of Cement | Per Cent Frit in Total Batch, by wt. | Per Cent Cement in Total Batch, by wt. | Per Cent Haydite in Total Batch, by wt. | Compressive Strength, lbs. per Sq. Inch 4 Days Firing at— | |
|---|---|---|---|---|---|
| | | | | 1400° F. | 1600° F. |
| 0 | 0 | 30.9 | 69.1 | 548 | 371 |
| 12½ | 3.7 | 29.8 | 66.5 | 1,020 | 1,029 |
| 25 | 7.2 | 28.8 | 64.0 | 847 | 892 |
| 50 | 13.4 | 26.7 | 59.9 | 1,046 | 1,242 |
| 75 | 18.9 | 25.1 | 56.0 | 1,821 | 2,533 |
| 100 | 23.6 | 23.6 | 52.8 | 3,581 | 4,317 |

TABLE IV

*Calcium aluminate cement—crushed firebrick plus glaze frit*

| Per Cent Frit By Weight of Cement | Per Cent Frit in Total Batch, by wt. | Per Cent Cement in Total Batch, by wt. | Per Cent Crushed Firebrick in Total Batch, by wt. | Compressive Strength, lbs. per Sq. Inch 4 Days Firing at— | |
|---|---|---|---|---|---|
| | | | | 1400° F. | 1600° F. |
| 0 | 0 | 20.7 | 79.3 | 1,193 | 854 |
| 12½ | 2.5 | 20.0 | 77.5 | 1,663 | 1,444 |
| 25 | 4.8 | 19.5 | 75.7 | 1,613 | 1,775 |
| 50 | 9.3 | 18.7 | 72.1 | 1,565 | 2,387 |
| 75 | 13.3 | 17.8 | 68.9 | 2,919 | 4,182 |
| 100 | 17.0 | 17.0 | 66.0 | 3,463 | 5,919 |

It will be observed from Tables III and IV that the compressive strengths of the cubes containing the smallest noted amount of frit, 3.7% by weight of the batch in Table III and 2.5% by weight of the batch in Table IV, are noticeably higher than those of the similar mixes without frit, and that in each table, in general, the compressive strength of the concrete increases with increased frit content.

Although it is not desired to limit the invention to a particular theory of operation, it is believed from the observed results that the increased compressive strengths of cements of the present invention are due to the fact that the frit functions as a flux, reacting under the heat when the refractory concrete mixture is fired to aid in the formation of the ceramic bond, which by reason of such fluxing action is stronger and more uniform than that obtained in similar mixtures without the frit. The use of such frit melting at a relatively low temperature such as 1600° F. or below and substantially insoluble in water and cement mixes does not, as explained, affect the hydraulic strength of the concrete but causes the development of a strong ceramic bond at temperatures which substantially overlap the temperatures at which the concrete retains substantial hydraulic strength.

Whereas particular embodiments of the invention have been described above for purposes of illustration, it will be evident that numerous variations of details are possible within the teaching of the invention. The scope of the invention therefore is to be defined by the following claims.

I claim:

1. A mix adapted for making refractory concrete by the addition of water comprising from 5 to 60% of calcium-aluminate cement; from 15 to 93.5% of aggregate selected from the group consisting of fire-clay grog, crushed brick, expanded shale, diatomaceous earth and vermiculite; and from .5 to 25% of a frit having a solubility less than .1% by weight in water-cement mixtures and effective to form a vitreous bond when heated to a temperature of 1400° F., said frit being composed for the most part of from 9 to 73% silicon dioxide, from 7 to 38% of oxides of metals selected from the group consisting of aluminum and boron and from 4 to 25% of oxides of metals selected from the group consisting of potassium and sodium.

2. A mix for making refractory concrete, said mix consisting of calcium-aluminate cement and from 12.5 to 100% by weight of cement of a frit having a solubility less than .1% by weight in water-cement mixtures and effective to form a vitreous bond when heated to a temperature of 1400° F., said frit being composed for the most part of from 9 to 73% silicon dioxide, from 7 to 38% of oxides of metals selected from the group consisting of aluminum and boron and from 4 to 25% of oxides of metals selected from the group consisting of potassium and sodium.

FRANK E. LOBAUGH.

REFERENCES CITED

The following references are of record in the file of this patent:

UNITED STATES PATENTS

| Number | Name | Date |
|---|---|---|
| 1,573,482 | Daltan | Feb. 16, 1926 |